US010522110B1

(12) United States Patent
Zhang

(10) Patent No.: US 10,522,110 B1
(45) Date of Patent: Dec. 31, 2019

(54) APPARATUSES, SYSTEMS, AND METHODS FOR MEASURING AND ADJUSTING THE LUMINANCE OF A HEAD-MOUNTED DISPLAY

(71) Applicant: FACEBOOK TECHNOLOGIES, LLC, Menlo Park, CA (US)

(72) Inventor: Rui Zhang, Redwood City, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 300 days.

(21) Appl. No.: 15/691,411

(22) Filed: Aug. 30, 2017

(51) Int. Cl.
*G09G 5/00* (2006.01)
*G09G 5/10* (2006.01)
*G02B 7/20* (2006.01)
*G02B 7/00* (2006.01)

(52) U.S. Cl.
CPC ............. *G09G 5/10* (2013.01); *G02B 7/002* (2013.01); *G02B 7/20* (2013.01); *G09G 2320/0233* (2013.01); *G09G 2320/045* (2013.01); *G09G 2320/0693* (2013.01); *G09G 2360/141* (2013.01); *G09G 2360/147* (2013.01)

(58) Field of Classification Search
CPC .. G09G 5/10; G09G 2320/0233; G02B 7/002; G02B 7/20
USPC ............................................................ 345/8
See application file for complete search history.

(56) References Cited

U.S. PATENT DOCUMENTS

| 9,472,025 B2 | 10/2016 | Thomas |
| 2015/0234189 A1* | 8/2015 | Lyons ................ G02B 27/0172 345/174 |
| 2016/0026253 A1* | 1/2016 | Bradski ............... G02B 27/225 345/8 |
| 2016/0217613 A1 | 7/2016 | Chin |
| 2016/0353094 A1* | 12/2016 | Rougeaux ......... G02B 27/0172 |
| 2016/0366399 A1 | 12/2016 | Tempel et al. |
| 2017/0161951 A1* | 6/2017 | Fix .......................... G09G 5/00 |
| 2017/0169790 A1 | 6/2017 | Richards et al. |
| 2017/0262703 A1* | 9/2017 | Wilson .................... G02B 27/02 |
| 2017/0352178 A1* | 12/2017 | Katz ....................... G06T 13/40 |

* cited by examiner

*Primary Examiner* — Jonathan M Blancha
(74) *Attorney, Agent, or Firm* — FisherBroyles, LLP

(57) ABSTRACT

An ocular assembly for a head-mounted display may include an opaque enclosure that defines (1) an interior space, (2) an exterior space, (3) a display aperture that admits image light emitted by a display screen into the interior space, (4) a lens aperture, and (5) a lateral aperture that admits the light from the interior space into the exterior space. The ocular assembly may also include an opaque covering for the lateral aperture that is moveable between (1) a closed position that prevents the image light from passing from the interior space through the lateral aperture to the exterior space and (2) an open position that allows the image light to pass from the interior space through the lateral aperture to the exterior space. Various other apparatuses, methods, and systems are also disclosed.

20 Claims, 9 Drawing Sheets

# APPARATUSES, SYSTEMS, AND METHODS FOR MEASURING AND ADJUSTING THE LUMINANCE OF A HEAD-MOUNTED DISPLAY

BACKGROUND

Putting on a virtual reality headset (also known as a "head-mounted display" or "HMD") may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation-governments may use them for military training simulations, doctors may use them to practice surgery, and engineers may use them as visualization aids.

Conventional virtual reality headsets are generally equipped with at least one display that generates and presents images to a user during operation of the virtual reality headset. The capabilities of these displays to produce images, however, can vary with the age of the displays. For example, the luminance of a display (e.g., the average luminance of the display, the luminance value of an individual pixel within the display, etc.) may decrease as the display ages. This reduction in luminance may lead to reduced image quality and/or "ghost" images in the display, which may in turn lead to reduced user satisfaction with the virtual reality headset.

Traditional solutions to correct such variances (i.e., to calibrate and/or to recalibrate the display) often require professional servicing of the display, and are generally not implementable by individual end-users. For example, conventional calibration solutions may require additional hardware that a user may not possess, and may be expensive or difficult for the user to obtain. Additionally, conventional calibration solutions may require unreliable or difficult to maintain usage and/or history data associated with the display, and therefore may provide sub-optimal and/or inaccurate corrections. Hence, the instant disclosure identifies and addresses a need for apparatuses, systems, and methods that enable end-users to simply, reliably, and affordably correct such variances in head-mounted displays.

SUMMARY

As will be described in greater detail below, the instant disclosure describes various apparatuses, systems, and methods for measuring and adjusting the luminance of a head-mounted display. In one example, an apparatus for measuring and adjusting the luminance of a head-mounted display may include an ocular assembly for a head-mounted display. The ocular assembly may include at least one opaque enclosure that defines (1) an interior space, (2) an exterior space, (3) a display aperture that admits image light emitted by a display screen of the head-mounted display into the interior space, (4) a lens aperture that admits light from the interior space into a lens assembly of the head-mounted display, and (5) a lateral aperture that admits the light from the interior space into the exterior space. The ocular assembly may further include an opaque covering for the lateral aperture that is coupled to the opaque enclosure and that is moveable between (1) a closed position that prevents the image light from passing from the interior space through the lateral aperture to the exterior space when the head-mounted display is in a normal operation mode and (2) an open position that allows the image light to pass from the interior space through the lateral aperture to the exterior space when the head-mounted display is in a calibration mode.

In some embodiments, when the opaque covering is in the closed position, the opaque covering prevents the image light from passing through the lateral aperture to a camera located in the exterior space. In such embodiments, when the opaque covering is in the open position, the image light passes from the interior space through the lateral aperture to the camera located in the exterior space. In some examples, the opaque covering includes (1) a lower portion that is pivotably coupled to the opaque enclosure and (2) an upper portion that (a) abuts the opaque enclosure when the opaque covering is in the closed position and (b) extends into the interior space when the opaque covering is in the open position.

In some embodiments, the opaque covering further includes an outer portion that includes a partially reflective surface. When the opaque covering is in the open position, the partially reflective surface of the outer portion of the opaque covering may direct image light from the interior space through the lateral aperture to the exterior space. In further examples, when the opaque covering is in the open position, the partially reflective surface directs light from the interior space through the lateral aperture toward the camera located in the exterior space.

A corresponding head-mounted-display system for measuring and adjusting the luminance of a head-mounted display may include (1) a display screen, (2) a lens assembly, and (3) an ocular assembly. The ocular assembly may include at least one opaque enclosure that defines (1) an interior space, (2) an exterior space, (3) a display aperture that admits image light emitted by the display screen, (4) a lens aperture that admits light from the interior space into the lens assembly, and (5) a lateral aperture that admits the light from the interior space into the exterior space. The ocular assembly may further include an opaque covering for the lateral aperture that is coupled to the opaque enclosure and that is moveable between (1) a closed position that prevents the image light from passing from the interior space through the lateral aperture to the exterior space when the head-mounted-display system is in a normal operation mode and (2) an open position that allows the image light to pass from the interior space through the lateral aperture to the exterior space when the head-mounted-display system is in a calibration mode.

In some embodiments, the head-mounted-display system for measuring and adjusting the luminance of a head-mounted display may further include a camera located in the exterior space, such that (1) when the opaque covering is in the closed position, the opaque covering prevents the image light from passing through the lateral aperture to the camera, and (2) when the opaque covering is in the open position, the image light passes from the interior space through the lateral aperture to the camera. In some embodiments, the camera may be configured to detect eye movements of a user of the head-mounted-display system during the normal operation mode.

In additional embodiments, the opaque covering may include (1) a lower portion that is pivotally coupled to the opaque enclosure and (2) an upper portion that (a) abuts the enclosure when the opaque covering is in the closed position and (b) extends into the interior space when the opaque covering is in the open position. The opaque covering may further include an outer portion that includes a partially reflective surface. In some examples, when the opaque covering is in the open position, the partially reflective surface of the outer portion of the opaque covering directs image light from the interior space through the lateral aperture to the exterior space. In addition, when the opaque covering is in the open position, the partially reflective surface may direct light from the interior space through the lateral aperture toward the camera located in the exterior space.

In some embodiments, the head-mounted-display system for measuring and adjusting the luminance of a head-mounted display may further include calibration circuitry that, when the head-mounted-display system is in a calibration mode, (1) directs the display screen to illuminate a pixel of the display screen in accordance with a predetermined output level, (2) detects an actual luminance of the pixel by using the camera to receive light generated by the pixel while the pixel is illuminated in accordance with the predetermined output level, (3) determines a new output level for the pixel based on the detected actual luminance of the pixel, and (4) directs the pixel to operate in accordance with the new output level.

In some examples, the calibration circuitry determines the new output level for the pixel by (1) determining a prospective output level for the pixel that, when the pixel is directed to operate in accordance with the prospective output level, will cause the pixel to generate an expected luminance, and (2) designating the determined prospective output level as the new output level. In additional examples, the calibration circuitry determines the prospective output level for the pixel by (1) accessing a look-up table that includes data representative of a compensation factor associated with the detected actual luminance of the pixel and (2) adjusting the predetermined output level in accordance with the compensation factor. In some examples, the calibration circuitry may determine the prospective output level for the pixel based on the age of the display screen.

A corresponding method for measuring and adjusting the luminance of a head-mounted display may include transitioning a head-mounted display from a normal operation mode to a calibration mode by moving an opaque covering from a closed position to an open position, such that, (1) when in the closed position, the opaque covering prevents image light emitted by a display screen of the head-mounted display from passing from an interior space, defined by an opaque enclosure of the head-mounted display, through a lateral aperture defined in the opaque enclosure, and (2) when in the open position, the opaque covering allows the image light to pass from the interior space through the lateral aperture to an exterior space defined by the opaque enclosure. The method may further include (1) directing, while the head-mounted display is in the calibration mode, the display screen to illuminate at least one pixel of the display screen in accordance with a predetermined output level and (2) detecting, through the lateral aperture using a camera positioned within the exterior space, an actual luminance of the pixel while the pixel is illuminated in accordance with the predetermined output level and while the head-mounted display is in the calibration mode.

In at least one embodiment, the method may further include (1) determining a new output level for the pixel based on the detected actual luminance of the pixel and (2) directing the pixel to operate in accordance with the new output level. In some embodiments, determining the new output level for the pixel based on the detected actual luminance of the pixel may include (1) determining a prospective output level for the pixel that, when the pixel is directed to operate in accordance with the prospective output level, will cause the pixel to generate an expected luminance and (2) designating the determined prospective output level as the new output level. In other examples, determining the prospective output level for the pixel may include (1) accessing a look-up table that includes data representative of a compensation factor associated with the detected actual luminance of the pixel and (2) adjusting the predetermined output level in accordance with the compensation factor.

In some embodiments, the method may further include transitioning the head-mounted display from the calibration mode to the normal operation mode by moving the opaque covering from the open position to the closed position.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
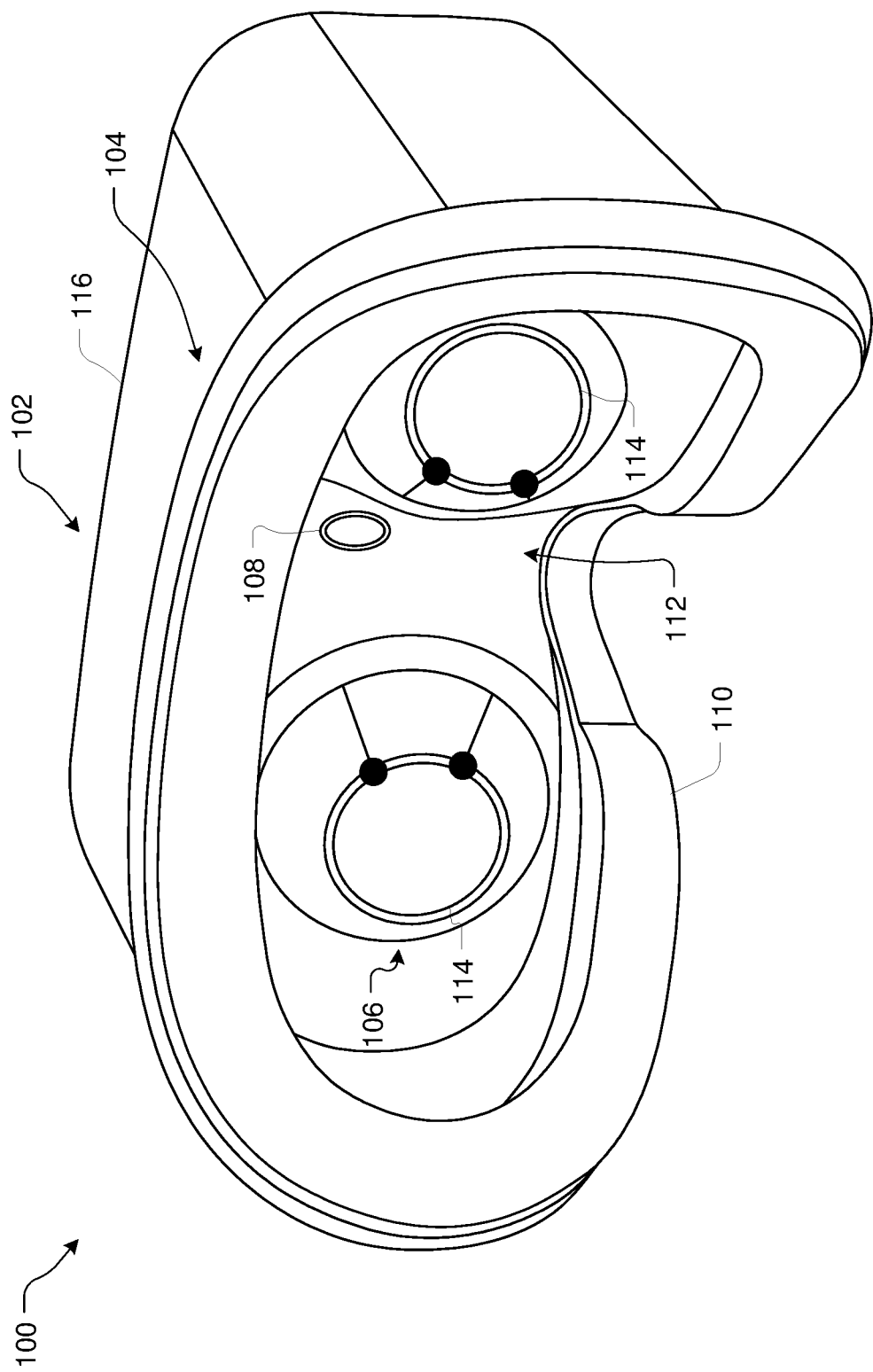
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for measuring and adjusting the luminance of a head-mounted display. As will be explained in greater detail below, embodiments of the instant disclosure may allow a head-mounted-display system to transition from a normal operation mode to a calibration mode. When the head-mounted-display system is in calibration mode, embodiments of the present disclosure may measure and/or adjust the luminance of a display included in the head-mounted-display system.

For example, when the head-mounted display is in normal operation mode, light from a display screen of the head-mounted-display system may pass through a display aperture defined within an opaque enclosure (e.g., an eye cup of the head-mounted display) that admits image light emitted by the display screen into an interior space defined by the opaque enclosure, and thence to a lens aperture that admits light from the interior space into a lens assembly of the head-mounted display.

Conversely, when the head-mounted display is in calibration mode, light emitted by the display screen may pass, via a lateral aperture defined within the opaque enclosure, from the interior space to an exterior space defined by the opaque enclosure. Accordingly, while in calibration mode, an exemplary system may direct the display screen to illuminate at least one pixel of the display screen in accordance with a predetermined output level. The exemplary system may then detect (using, e.g., a camera positioned within the exterior space) an actual luminance value of the illuminated pixel as light from the illuminated pixel passes through the lateral aperture. The exemplary system may then determine a new output level for the pixel based on the detected actual luminance of the pixel, and direct the pixel to operate in accordance with the new output level.

In this and other ways, the apparatuses, systems, and methods disclosed herein may accurately and efficiently measure and adjust the luminance of a head-mounted display without professional servicing of the head-mounted display. This calibration may, in turn, improve the quality of images presented to a user by way of the head-mounted display, and increase user satisfaction with the head-mounted display.

The following will provide, with reference to FIG. 1, examples of head-mounted-display systems. In addition, the discussion corresponding to FIGS. 2-8 will provide examples of various apparatuses and systems for measuring and adjusting the luminance of head-mounted-display systems. Finally, the discussion corresponding to FIG. 9 will provide examples of methods for measuring and adjusting luminance of a head-mounted display.

FIG. 1 is a perspective view of a head-mounted-display system 100 in accordance with some embodiments. As shown in this figure, head-mounted-display system 100 may include a head-mounted-display device 102 (i.e., head-mounted display) and a facial-interface system 104. The term "head-mounted display," as used herein, generally refers to any type or form of display device or system that is worn on or about a user's head and displays visual content to the user. Head-mounted displays may display content in any suitable manner, including via a display screen (e.g., an LCD, LED, or OLED screen), a projector, a cathode ray tube, an optical mixer, etc. Head-mounted displays may display content in one or more of various media formats. For example, a head-mounted display may display video, photos, and/or computer-generated imagery (CGI). Head-mounted-display device 102 may include a head-mounted-display housing 116 surrounding various components of head-mounted-display device 102, including one or more lens assemblies 114, one or more ocular assemblies 106, and various electronic components, including a camera 108 and display components (e.g., a display screen) as described above. In some examples, as will be described in detail below, head-mounted-display device 102 may also include calibration circuitry that may perform various operations to measure and/or adjust the luminance of the display screen included in head-mounted-display device 102.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, and so forth.

In some embodiments, facial-interface system 104 may be configured to comfortably rest against a region of the user's face, including a region surrounding the user's eyes, when head-mounted-display system 100 is worn by the user. In these embodiments, facial-interface system 104 may include a facial interface 110 that contacts selected regions of the user's face. Facial interface 110 may surround a viewing region 112 that includes the user's field of vision while the user is wearing head-mounted-display system 100, allowing the user to look through lens assemblies 114 of head-mounted-display device 102 without interference from outside light while the user is wearing head-mounted-display system 100.

Figure 2:
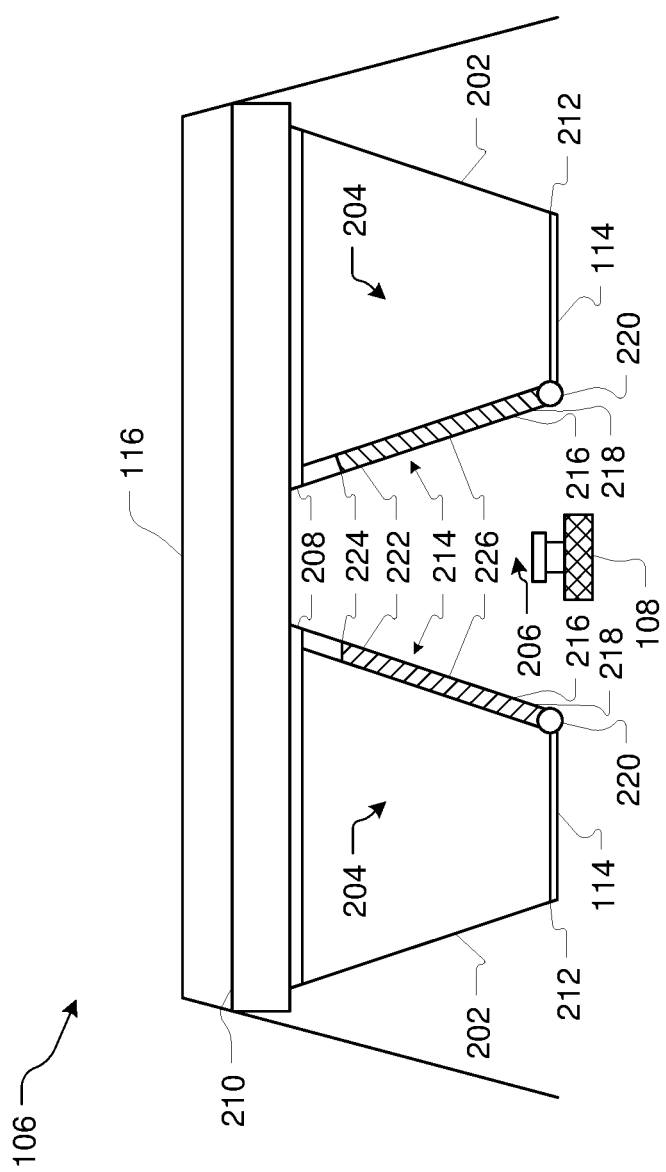
FIG. 2 is a cross-sectional top view of a head-mounted-display system in a normal operation mode in accordance with some embodiments.

FIG. 2 is a cross-sectional top view of ocular assembly 106 when in a "normal" operation mode. As shown, ocular assembly 106 may include at least one opaque enclosure 202 that defines an interior space 204, an exterior space 206, a display aperture 208 that admits image light emitted by a display screen 210 into interior space 204, and a lens aperture 212 that admits light from interior space 204 into lens assembly 114. In some embodiments, opaque enclosure 202 may be referred to as an "eye cup," an "eye shield," and so forth.

In some embodiments, display screen 210 may be included in head-mounted-display device 102 (e.g., enclosed within and/or coupled to head-mounted display housing 116). Display screen 210 may include a plurality of pixels and subpixels that form visible images according to any suitable display technology. For example, display screen 210 may include image pixels formed of light-emitting diodes (LEDs), organic light-emitting diodes (OLEDs), plasma cells, electrophoretic display elements, liquid crystal display (LCD) components, electrowetting display elements, cathode ray tube (CRT) elements, and/or any other suitable image pixel technology. In some examples, images may be produced by driving pixels and/or sub-pixels at different currents and/or voltages such that different amounts of light are emitted from each of the pixels and/or sub-pixels.

As shown in FIG. 2, in some examples a lateral aperture 214 defined within opaque enclosure 202 may be dimensioned to admit light from interior space 204 into exterior space 206. In these examples, ocular assembly 106 may further include an opaque covering 216, coupled to opaque enclosure 202, that covers lateral aperture 214. In some embodiments, opaque covering 216 may include a lower portion 218 that is pivotably coupled to opaque enclosure 202 by way of a pivot 220. Pivot 220 may include any suitable connector that may allow opaque covering 216 to move such that, when opaque covering 216 is an open position, light may pass from interior space 204 through lateral aperture 214 into exterior space 206.

Accordingly, in some examples, opaque covering 216 may be movable (e.g., by way of pivot 220) between (1) a closed position that prevents image light (e.g., image light generated by display screen 210) from passing from interior space 204, through lateral aperture 214, and into exterior space 206 when head-mounted-display system 100 is in a normal operation mode and (2) an open position that allows image light to pass from interior space 204, through lateral aperture 214, and into exterior space 206 when head-mounted-display system 100 is in a calibration mode.

When in the closed position, an upper portion 222 of the opaque covering may abut opaque enclosure 202 (e.g., at interface 224). When in the open position, in contrast, upper portion 222 may extend into interior space 204. Opaque covering 216 may further include an outer portion 226 that may include an at least partially reflective surface. For example, outer portion 226 may include a mirror or other surface capable of at least partially reflecting light. As will be described in greater detail below, this reflective surface may, in some examples, reflect light emitted by display screen 210 into exterior space 206 and towards camera 108.

The configuration illustrated in FIG. 2 may be referred to as a normal operation mode and/or normal configuration. While in this configuration, light from display screen 210 may enter interior space 204 through display aperture 208. From thence, the light from the display screen 210 may pass through interior space 204 to lens aperture 212 into lens assembly 114, and from thence to the eyes of the user. In this configuration, opaque covering 216 is in a closed position, with upper portion 222 abutting opaque enclosure 202 at interface 224. As such, opaque covering 216 may prevent image light from passing from interior space 204 through lateral aperture 214 into exterior space 206. In the normal configuration illustrated in FIG. 2, a user may receive and/or perceive light generated by display screen 210, which may enable a user to utilize the head-mounted display to experience a virtual reality experience and/or a real-world experience, as described herein.

Figure 3:
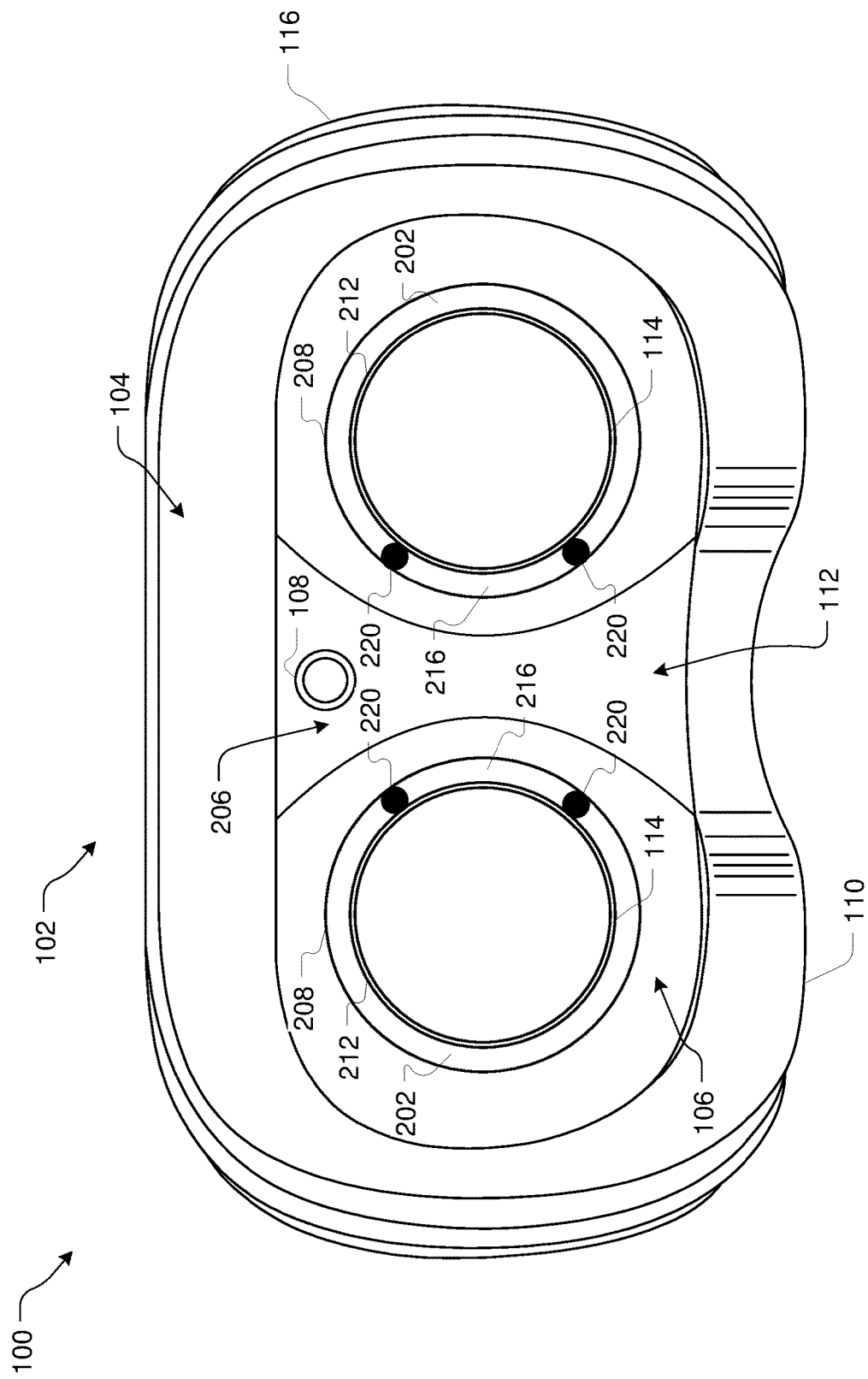
FIG. 3 is a front view of a head-mounted-display system in a normal operation mode in accordance with some embodiments.

FIG. 3 is a front view of head-mounted-display system 100 when in the normal operation mode. As shown, head-mounted-display system 100 may include a head-mounted-display device 102, a facial-interface system 104, and an ocular assembly 106. Ocular assembly 106 may include at least one opaque enclosure 202 that defines exterior space 206, display aperture 208, and lens aperture 212. Although not shown in FIG. 3, ocular assembly 106 may further define interior space 204 and a lateral aperture 214. As further shown in FIG. 3, ocular assembly 106 may further include an opaque covering 216 for lateral aperture 214 that may be coupled (e.g., by way of one or more pivots 220) to opaque enclosure 202, and that may be movable (e.g., about one or more pivots 220) between (1) a closed position that prevents light (e.g., image light emitted by one or more display screens of head-mounted-display system 100) from passing from interior space 204 through lateral aperture 214 to exterior space 206 when the head-mounted display is in a normal operation mode and (2) an open position that allows image light to pass from interior space 204 through lateral aperture 214 to exterior space 206 when the head-mounted-display system 100 is in a calibration mode. As FIG. 3 shows head-mounted-display system 100 in the normal operation mode, opaque covering 216 is in the closed position. In this configuration, display aperture 208 may admit light emitted by a display screen of the head-mounted-display system 100 into interior space 204, and lens aperture 212 may admit light from interior space 204 into lens assembly 114.

Figure 4:
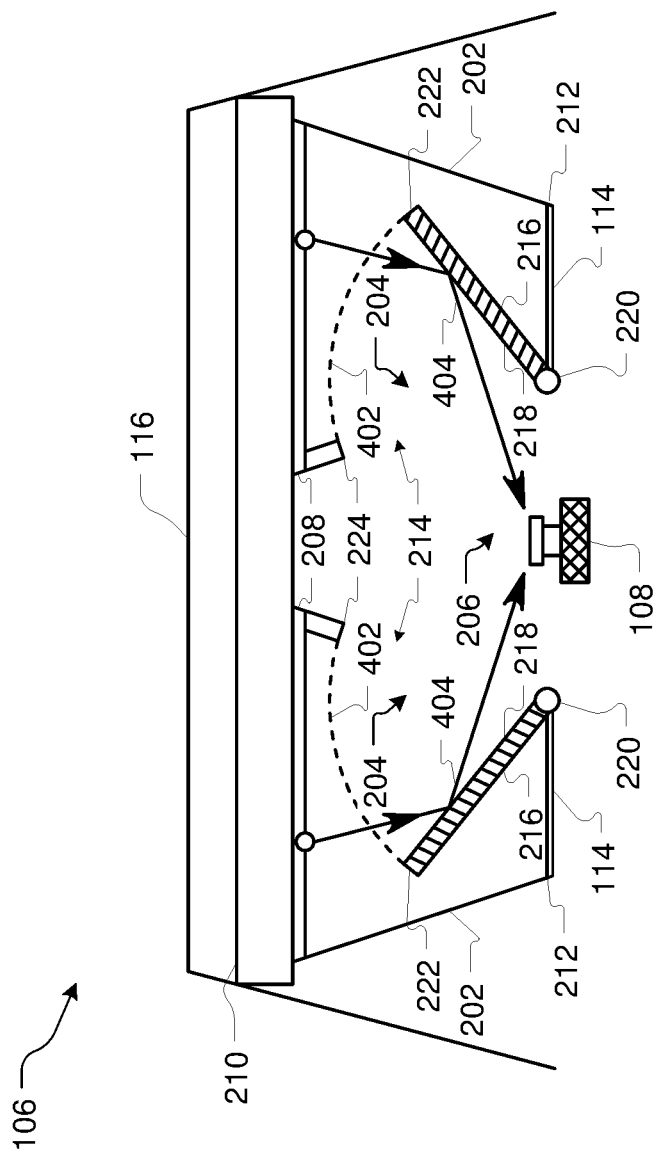
FIG. 4 is a cross-sectional top view of a head-mounted-display system in a calibration mode in accordance with some embodiments.

FIG. 4 is a cross-sectional top view of ocular assembly 106 in accordance with some embodiments. FIG. 3 shows the elements of FIG. 2 after head-mounted-display device 102 has transitioned from a normal operation mode to a calibration mode. As shown in FIG. 3, opaque covering 216 has moved from the closed position to the open position, passing through arc 402. Instead of abutting opaque enclosure 202 at interface 224, upper portion 222 now extends into interior space 204. In this configuration, outer portion 226 may reflect light generated by display screen 210 (e.g., light ray 404) through lateral aperture 214 into exterior space 206.

In some examples, camera 108 may be located in exterior space 206. In such examples, outer portion 226 of opaque covering 216 may reflect light generated by display screen 210 through lateral aperture 214 and into camera 108 located in exterior space 206. Camera 108 may represent any suitable camera that may detect light generated by display screen 210 through lateral aperture 214 while head-mounted-display system 100 is in the calibration mode. For example, camera 108 may be configured to detect eye movements of a user wearing the head-mounted display during the normal operation mode. Camera 108 may be located at any suitable location within exterior space 206. In other words, camera 108 may be located at any suitable location outside of interior space 204.

Examples of camera 108 may include, without limitation, one or more digital cameras that convert captured light into digital signals, such as cameras having charge-coupled device (CCD) image sensors, cameras having complementary metal-oxide semiconductor (CMOS) image sensors, and/or any other suitable camera device. In some embodiments, camera 108 may be sensitive to one or more specific portions of the electromagnetic spectrum including, but not limited to, an infrared and/or near-infrared portion of the electromagnetic spectrum.

In some examples, pivot 220 may allow for manual operation of opaque covering 216. For example, a user may manually move opaque covering 216 between the closed position and the open position. Additionally or alternatively, in some examples, pivot 220 may automatically move opaque covering 216 between the closed position and the open position in response to a signal from a control device. For example, pivot 220 may include an actuator that may receive a signal from a suitable control device that directs pivot 220 to transition opaque covering 216 between the closed position and the open position. In response to receiving the signal, the actuator included in pivot 220 may transition opaque covering 216 between the closed position and the open position. Hence, pivot 220 may enable automated positioning of opaque covering 216 via a suitable control device.

Additionally, head-mounted-display system 100 may include one or more sensors that may indicate to a suitable control device a status of opaque covering 216. For example, opaque covering 216, pivot 220, and/or interface 224 may further include a pressure sensor that provides data to the control device regarding a status of opaque covering 216, such as whether opaque covering 216 is in an open position, whether opaque covering 216 is in a closed position, a present orientation of opaque covering 216 relative to display screen 210, and so forth.

FIGS. 5A through 5D illustrate various views of an ocular assembly 500 for measuring and adjusting the luminance of a head-mounted display as described herein. As shown, ocular assembly 500 may include an opaque enclosure 502 that defines an interior space 504 and an exterior space 506. Opaque enclosure 502 may further define (1) a display aperture 508 that may admit light, such as light emitted by a display screen of a head-mounted display, into interior space 504 and (2) a lens aperture 510 that may admit light from interior space 504 into a lens assembly of a head-mounted display.

Opaque enclosure 502 may further define a lateral aperture 512 that admits light from interior space 504 into exterior space 506. In some embodiments, ocular assembly 500 may further include an opaque covering 514 that is coupled to opaque enclosure 502.

Opaque covering 514 may be movable between an open position and a closed position. FIGS. 5A and 5B show ocular assembly 500 in the closed position. While in the closed portion, opaque covering 514 may prevent image light from passing from interior space 504 through lateral aperture 512 into exterior space 506. As detailed above, ocular assembly 500 may be in this configuration when a head-mounted-display system that includes ocular assembly 500 is in a normal operation mode.

Figure 5C:
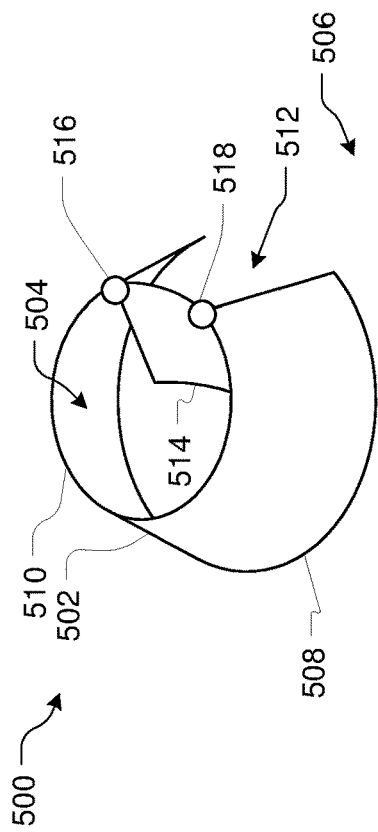
FIGS. 5A through 5D illustrate various perspective views of an ocular assembly for measuring and adjusting the luminance of a head-mounted display in accordance with some embodiments.
Figure 5D:
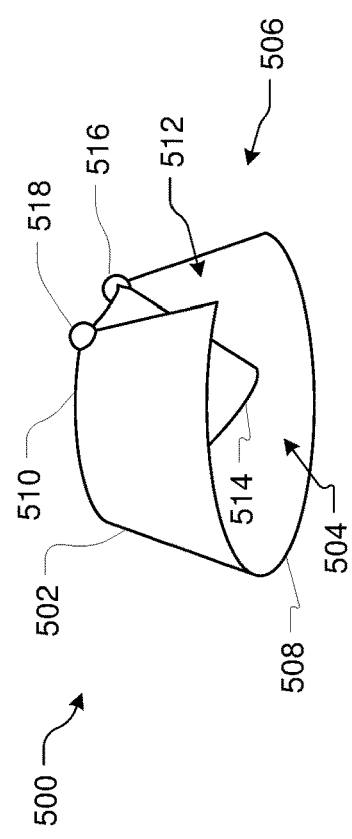
Figure 5A:
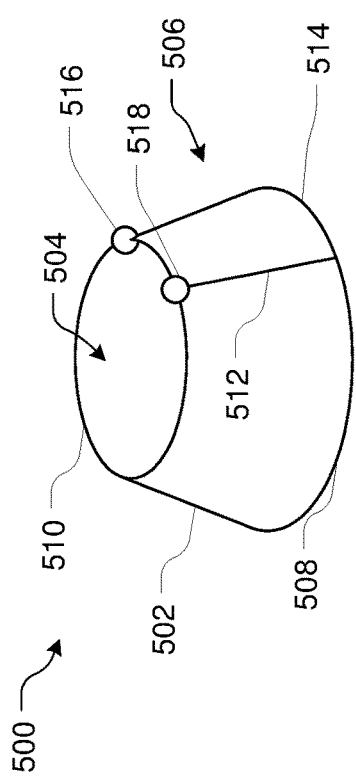
Figure 5B:
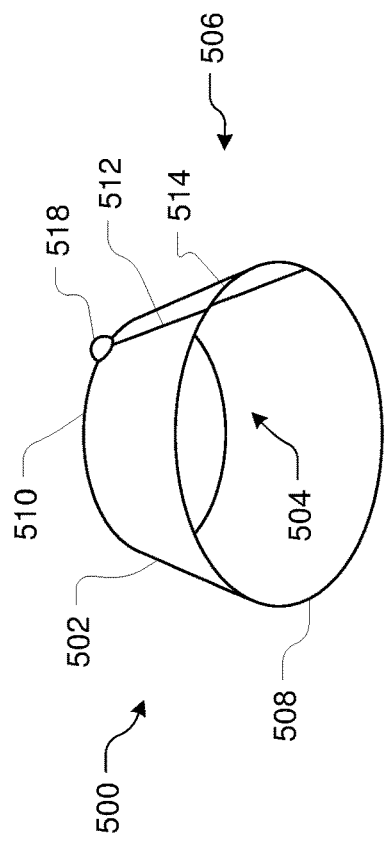

FIGS. 5C and 5D show ocular assembly 500 in the open position. When in this position, an upper portion of opaque covering 514 extends (e.g., by pivoting about one or more pivot points 516 and 518) into interior space 504. When in this position, opaque covering 514 may allow image light to pass from interior space 504 through lateral aperture 512 to exterior space 506. In some embodiments, and as will be described in greater detail below, opaque covering 514 may reflect light from interior space 504 through lateral aperture 512 to exterior space 506 via a surface of opaque covering 514 that may at least partially face display aperture 508 when opaque covering 514 is in the open position. Ocular assembly 500 may be in this configuration when a head-mounted-display system that includes ocular assembly 500 is in a calibration mode.

While head-mounted-display system 100 is in the calibration mode, the apparatuses and/or systems described herein may allow light from display screen 210 to pass from interior space 204 through lateral aperture 214 and into exterior space 206. As camera 108 may also be located in exterior space 206, camera 108 may receive at least a portion of the light from display screen 210 through lateral aperture 214. In at least this way, camera 108 may be utilized to measure the luminance of at least a portion (e.g., at least one pixel) of display screen 210 while head-mounted-display system 100 is in the calibration mode. The disclosed systems may then utilize the measured luminance to calibrate and/or recalibrate display screen 210, as detailed below.

Figure 6:
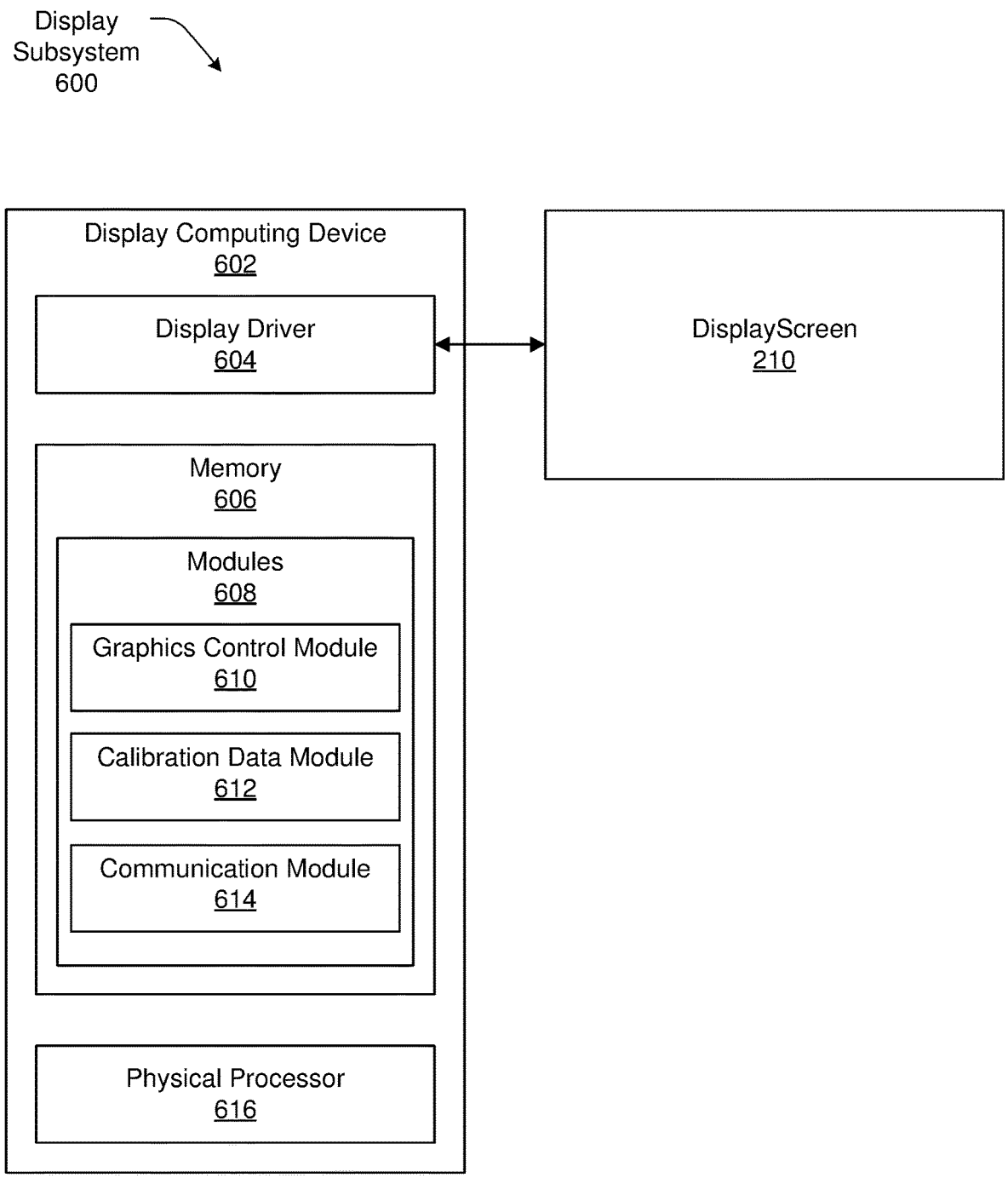
FIG. 6 is a block diagram of an exemplary display subsystem for measuring and adjusting the luminance of a head-mounted display.

FIG. 6 illustrates an exemplary display subsystem 600 that may be utilized to measure and adjust the luminance of a head-mounted display (e.g., display screen 210). As shown in FIG. 6, display subsystem 600 may include display screen 210 and a display computing device 602 for controlling display screen 210. In some embodiments, display subsystem 600 may include a plurality of displays, such as a pair of displays utilized in head-mounted-display device 102. For example, head-mounted-display device 102 may include a pair of display screens 210 that are each controlled by a separate display computing device 602. Additionally or alternatively, a pair of display screens 210 of head-mounted-display device 102 may both be controlled by a single display computing device 602.

According to at least one embodiment, display computing device 602 may include a display driver 604 for driving pixels of display screen 210. Display driver 604 may include any suitable circuitry for driving display screen 210. For example, display driver 604 may include at least one integrated circuit (IC). In some examples, display driver 604 may include timing controller (TCON) circuitry that receives image signals and generates horizontal and vertical timing signals for display screen 210. Display driver 604 may, for example, be mounted on an edge of a thin-film-transistor (TFT) substrate layer of display screen 210.

As illustrated in FIG. 6, example display subsystem 600 may also include one or more memory devices, such as memory 606. Memory 606 generally represents any type or form of volatile or non-volatile storage device or medium capable of storing data and/or computer-readable instructions. In one example, memory 606 may store, load, and/or maintain one or more of modules 608. Examples of memory 606 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Display subsystem 600 may also include one or more modules 608 for performing one or more display tasks. As shown in FIG. 6, display subsystem 600 may include a graphics control module 610 that provides display data and control signals to display driver 604 for producing images on display screen 210. Graphics control module 610 may include, for example, a video card and/or video adapter that is used to provide video data and/or display control signals to display screen 210. In some examples, video data may include text, graphics, images, moving video content, and/or any other suitable image content to be presented on display screen 210.

In at least one embodiment, display subsystem 600 may include a calibration data module 612 that stores and utilizes calibration data for display screen 210. For example, calibration data module 612 may include calibration data, such as correction factors, that are applied to video data utilized by display driver 604 to produce calibrated images on display screen 210. As will be described in greater detail below, such calibration data may be generated by a system for measuring and adjusting the luminance of a head-mounted display based on image light data obtained (e.g., via camera 108 through lateral aperture 214) from light emitted by one or more pixels of display screen 210.

Additionally, display subsystem 600 may include a communication module 614 that receives video data and calibration data from one or more computing devices. For example, communication module 614 may receive video data to be displayed on display screen 210 from any suitable video and/or image source. Communication module 614 may also, for example, receive calibration data from a display calibration system. In some examples, communication module 614 may also receive user input supplied by a user via an input-output device (e.g., touch screens, buttons, joysticks, click wheels, scrolling wheels, touch pads, keypads, keyboards, microphones, speakers, tone generators, position and/or orientation sensors, vibrators, cameras, sensors, light-emitting diodes and/or other status indicators, data ports, etc.) to display subsystem 600. In at least one example, communication module 614 may also send data from display subsystem 600 to external devices and/or to a user.

Display calibration information may be loaded onto display subsystem 600 during and/or following manufacturing. For example, as will be described in greater detail below, correction factors, such as color, illumination intensity, and/or location-specific correction factors may be generated and stored on display subsystem 600. Such stored correction factors may be accessed during operation of display screen 210 to produce calibrated images for a user. For example, incoming video data including pixel output levels for display screen 210 may be received by communication module 614 and calibration data module 612 may, based on the received pixel output levels, calculate and apply appropriate correction factors to the pixel output levels to obtain new pixel output levels.

In certain embodiments, one or more of modules 608 in FIG. 6 may represent one or more software applications or programs that, when executed by a computing device, may cause the computing device to perform one or more tasks. For example, and as will be described in greater detail below, one or more of modules 608 may represent modules stored and configured to run on one or more computing devices (e.g., head-mounted-display device 102 shown in FIG. 1). One or more of modules 608 in FIG. 6 may also represent all or portions of one or more special-purpose computers configured to perform one or more tasks.

As illustrated in FIG. 6, example display subsystem 600 may also include one or more physical processors, such as physical processor 616. Physical processor 616 generally represents any type or form of hardware-implemented processing unit capable of interpreting and/or executing computer-readable instructions. In one example, physical processor 616 may access and/or modify one or more of modules 608 stored in memory 606. Additionally or alternatively, physical processor 616 may execute one or more of modules 608 to facilitate calibration of display screen 210. Examples of physical processor 616 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

In some embodiments, head-mounted-display system 100 may also include calibration circuitry configured to measure and adjust the luminance of a display screen (e.g., display screen 210) included in head-mounted-display system 100 while head-mounted-display system 100 is in the calibration mode (e.g., while opaque covering 216 is in the open position). Accordingly, the calibration circuitry may work in concert with display subsystem 600 to calibrate display screen 210. As used herein, the term "calibration circuitry" may include, but is not limited to, any suitable electronic or computing device that may perform one or more operations designed to measure and adjust the luminance of a display screen included in head-mounted-display system 100 (e.g., display screen 210).

Figure 7:
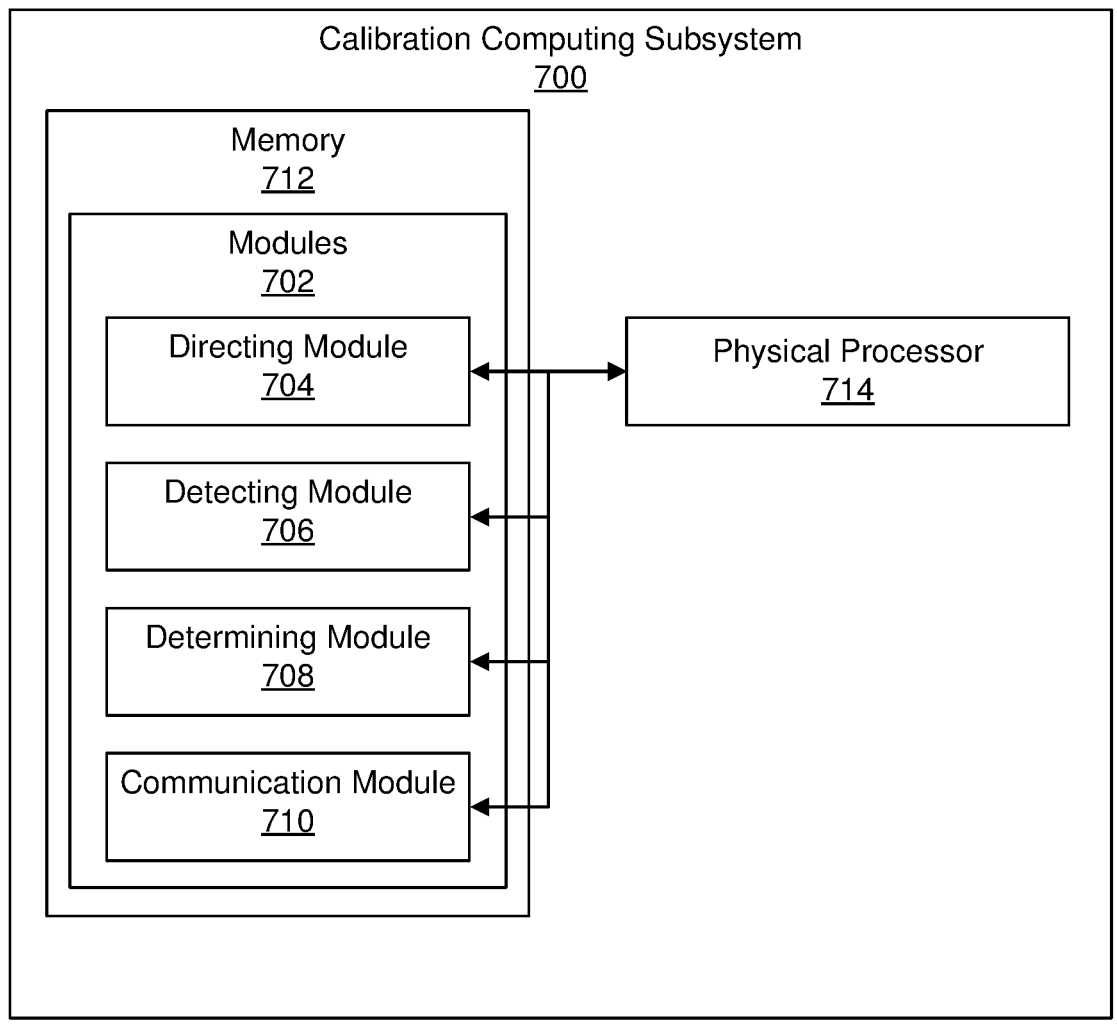
FIG. 7 is a block diagram of an exemplary calibration computing subsystem for measuring and adjusting the luminance of a head-mounted display.

FIG. 7 illustrates a block diagram of an exemplary calibration computing subsystem 700 (subsystem 700) for measuring and adjusting the luminance of a head-mounted display in accordance with some embodiments. As illustrated in this figure, subsystem 700 may include one or more modules 702 for performing one or more tasks. As will be described in greater detail below, modules 702 may include a directing module 704 that directs a display screen included in head-mounted-display system 100 (e.g., display screen 210) to illuminate a pixel of the display screen in accordance with a predetermined output level. Additionally, subsystem 700 may include a detecting module 706 that detects an actual luminance of the illuminated pixel by using a camera included in head-mounted-display system 100 (e.g., camera 108) to receive light generated by the illuminated pixel while the pixel is illuminated in accordance with the predetermined output level.

Exemplary subsystem 700 may further include a determining module 708 that determines a new output level for the pixel based on the detected actual luminance of the pixel. In some embodiments, determining module 708 may determine the new output level by (1) determining a prospective output level for the pixel that, when the pixel is directed to operate in accordance with the prospective output level, will cause the pixel to generate an expected luminance and (2) designating the determined prospective output level as the new output level. In some embodiments, determining module 708 may determine the prospective output level by (1) accessing a look-up table that includes data representative of a compensation factor associated with the detected actual luminance of the pixel and (2) adjusting the predetermined output level in accordance with the compensation factor. In some examples, determining module 708 may further determine the prospective output level for the pixel based on the age of the display screen.

In some embodiments, directing module 704 may further direct the pixel to operate in accordance with the new output level. Directing module 704 may perform this task in any suitable way, such as via a display subsystem of head-mounted-display system 100. As will be explained in greater detail below, subsystem 700 may also include a communication module 710 that communicates with one or more devices, such as a camera 108, a pivot 220, and/or a display screen 210. In at least one example, communication module 710 may also send data from subsystem 700 to external devices and/or to a user.

In certain embodiments, one or more of modules 702 in FIG. 7 may represent one or more software applications or programs that, when executed by subsystem 700, may cause subsystem 700 to perform one or more tasks. As illustrated in FIG. 7, subsystem 700 may also include one or more memory devices, such as memory 712.

Memory 712 generally represents any type or form of volatile or non-volatile storage device or medium capable of storing data and/or computer-readable instructions. In one example, memory 712 may store, load, and/or maintain one or more of modules 702.

Subsystem 700 may also include one or more physical processors, such as physical processor 714. Physical processor 714 generally represents any type or form of hardware-implemented processing unit capable of interpreting and/or executing computer-readable instructions. In one example, physical processor 714 may access and/or modify one or more of modules 702 stored in memory 712. Additionally or alternatively, physical processor 714 may execute one or more of modules 702 to facilitate calibration of display screen 210. In one example, physical processor 714 may access and/or modify one or more of modules 702 stored in memory 712. Additionally or alternatively, physical processor 714 may execute one or more of modules 702 to facilitate calibration of a display, such as display screen 210.

Although illustrated as separate computing devices herein, in some implementations display computing device 602 and subsystem 700 may share one or more components and/or functions. For example, in some implementations, functions performed by physical processor 616 may be performed by physical processor 714 and/or one or more functions performed by physical processor 714 may be performed by physical processor 616. Additionally or alternatively, one or more modules 608 may be stored in memory 712, and/or one or more modules 702 may be stored in memory 606.

Figure 8:
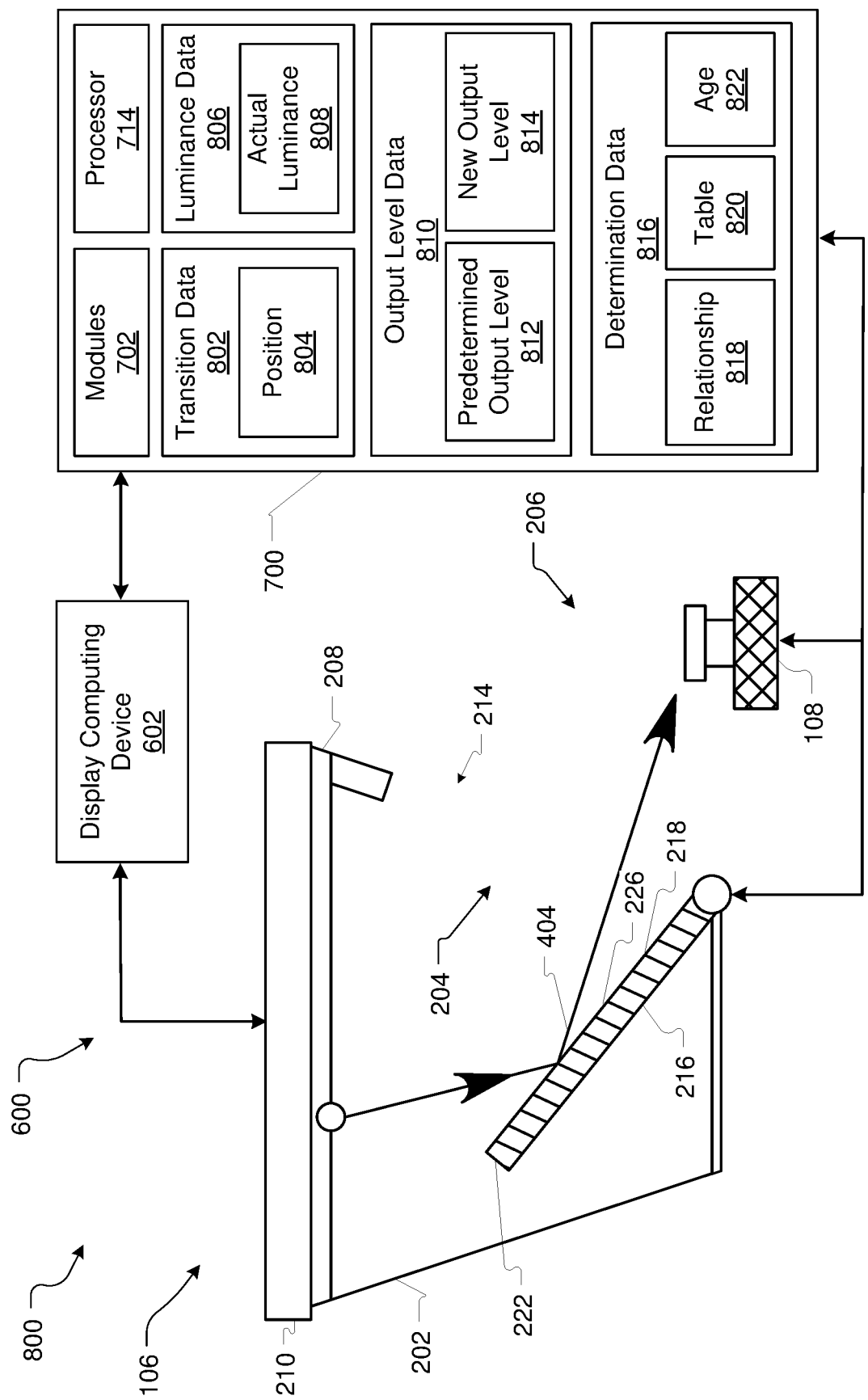
FIG. 8 is a block diagram of an exemplary system for measuring and adjusting the luminance of a head-mounted display.

FIG. 8 illustrates an exemplary display calibration system 800 for measuring and adjusting the luminance of a head-mounted display. As shown in this figure, display calibration system 800 may include an ocular assembly 106, a display subsystem 600 including display computing device 602 for controlling display screen 210, and a subsystem 700. As shown, subsystem 700 may be in communication (e.g., by way of communication module 710) with camera 108, display screen 210, and/or pivot 220.

In the example illustrated in FIG. 8, opaque covering 216 of ocular assembly 106 is shown in an open position, such that upper portion 222 extends into interior space 204 and outer portion 226 is positioned to reflect light generated by display screen 210 (e.g., light ray 404) from interior space 204 through lateral aperture 214 to camera 108 located in exterior space 206.

As described above, in some embodiments, subsystem 700 may send a control signal to ocular assembly 106 (e.g., pivot 220) to direct pivot 220 to transition between the closed position and the open position. Additionally or alternatively, a user may manually move opaque covering 216 between the closed position and the open position. Hence, as shown in FIG. 8, ocular assembly 106 has either received a control signal from subsystem 700 and has moved opaque covering 216 to the open position in response to receiving the control signal from subsystem 700, a user has manually moved opaque covering 216 from the closed position to the open position, and/or opaque covering 216 has been moved from the closed position to the open position in any other suitable way.

In some embodiments, subsystem 700 may receive transition data 802 from ocular assembly 106 (e.g., from one or more sensors included in ocular assembly 106). For example, in some embodiments, one or more modules 702 (e.g., communication module 710) may cause subsystem 700 to receive a position message 804 ("position 804") that indicates that opaque covering 216 is in the open position. One or more modules 702 (e.g., determining module 708) may then determine, in response to receiving position message 804 and/or based on position message 804 indicating that opaque covering 216 is in the open position, that head-mounted-display system 100 has transitioned to the calibration mode.

In this configuration, one or more of modules 702 may perform one or more operations to measure and adjust the luminance of a head-mounted display. For example, directing module 704 may direct, via communication module 710 and/or display computing device 602, display screen 210 to illuminate a pixel of display screen 210 in accordance with a predetermined output level (e.g., predetermined output level 812 in output level data 810). As used herein, a "predetermined output level" may be any suitable output level for a pixel that may cause the pixel to illuminate (e.g., generate light). For example, predetermined output level 812 in output level data 810 may be a specific voltage that, when a pixel is driven according to the specific voltage, may cause the pixel to illuminate. In some embodiments, the predetermined output level may be correlated to an expected actual luminance of the pixel such that, when the pixel is illuminated in accordance with the predetermined output level, the pixel may be illuminated with a known, estimated, or expected actual luminance (e.g., an expected intensity of light).

Based on the direction from directing module 704 to illuminate the pixel in accordance with the predetermined output level, the pixel may illuminate with an actual luminance (e.g., a real level of light output). While the pixel is illuminated in accordance with the predetermined output level (e.g., predetermined output level 812), light from the illuminated pixel (e.g., as light ray 404) may pass through display aperture 208 into interior space 204, and from thence through lens aperture 212 and to exterior space 206. In some embodiments, as shown in FIG. 7, light from the illuminated pixel (e.g., as light ray 404) may reflect off a partially reflective surface of outer portion 226 of opaque covering 216. This partially reflective surface of outer portion 226 may direct the light from the illuminated pixel from interior space 204 through lens aperture 212 and to exterior space 206. In some additional embodiments, the partially reflective surface of outer portion 226 may direct the light from the illuminated pixel from interior space 204 through lens aperture 212 to camera 108 located in exterior space 206.

When light from the illuminated pixel reaches exterior space 206, camera 108, also located in exterior space 206, may receive and/or perceive the light and generate actual luminance 808 based on the light received from the illuminated pixel. Camera 108 may then communicate actual luminance 808 to subsystem 700 in any suitable way. For example, camera 108 and subsystem 700 may be in communication by way of communication module 710, one or more physical data connections, and/or one or more wireless data connections. Subsystem 700 may receive actual luminance 808 and store it as part of luminance data 806.

Subsequent to receiving actual luminance 808, one or more modules 702 may determine a new output level 814 for the pixel based on the detected actual luminance of the pixel (e.g., data indicating an actual luminance of the pixel, such as actual luminance 808). For example, determining module 708 may determine new output level 814 based on actual luminance 808. Determining module 708 may determine a new output level for the pixel based on actual luminance 808 in a variety of different ways. For example, determining module 708 may determine a prospective output level for the pixel that, when the pixel is directed (e.g., by display computing device 602 and/or subsystem 700) to operate in accordance with the prospective output level, will cause the pixel to generate an expected luminance.

In some embodiments, determining module 708 may determine the prospective output level by calculating the prospective output level based on predetermined output level 812, actual luminance 808, and any other suitable factor. Subsystem 700 may maintain information regarding such factors as determination data 816. For example, a predictable relationship (e.g., a linear relationship, a proportional relationship, and so forth) may exist between the detected actual luminance of the pixel when illuminated in accordance with the predetermined output level and a compensation factor that may be applied to the predetermined output level that may cause the pixel to generate an expected luminance. Determining module 708 may determine the prospective output level for the pixel in accordance with this predictable relationship by accessing relationship data 818 ("relationship 818") representative of the predictable relationship, calculating the prospective output level for the pixel based on the accessed relationship data 818, and storing the result as new output level 814 in output level data 810.

Additionally or alternatively, determining module 708 may determine the prospective output level by accessing a look-up table (e.g., table 820) that includes data representative of a compensation factor associated with the detected actual luminance of the pixel as represented by actual luminance 808. Determining module 708 may then adjust the predetermined output level in accordance with the data representative of the compensation factor and store the result as new output level 814 in output level data 810.

In some embodiments, determining module 708 may further determine the prospective output level for the pixel based on the age of display screen 210 (e.g., age 822). For example, a predictable relationship may exist between an output level for the pixel, the detected actual luminance of the pixel, and the age of display screen 210. Determining module 708 may utilize this predictable relationship to determine the prospective output level of the pixel. Once determining module 708 determines the prospective output level of the pixel (e.g., an output level for the pixel that, when the pixel is directed to operate in accordance with the prospective output level, will cause the pixel to generate an expected luminance), determining module 708 may designate the determined prospective output level as the new output level, and store the new output level as new output level 814 in output level data 810.

Subsequent to the determination of new output level 814, one or more of modules 702 may direct the pixel to operate in accordance with new output level 814. For example, directing module 704 may send (e.g., by way of communication module 710) new output level 814 to display computing device 602, which may utilize new output level 814 to drive display screen 210, which may result in the pixel operating in accordance with new output level 814.

In some embodiments, subsystem 700 may repeat the calibration process one or more additional times as needed to further calibrate display screen 210. Accordingly, subsystem 700 may facilitate real-time calibration of display screen 210 and may cause a plurality of new output levels 814 to be generated and stored on display subsystem 600 for driving display screen 210. In at least one embodiment, the total number of new output levels 814 that may be generated and stored on display subsystem 600 for driving display screen 210 may equal or exceed a number of pixels included in display screen 210.

Figure 9:
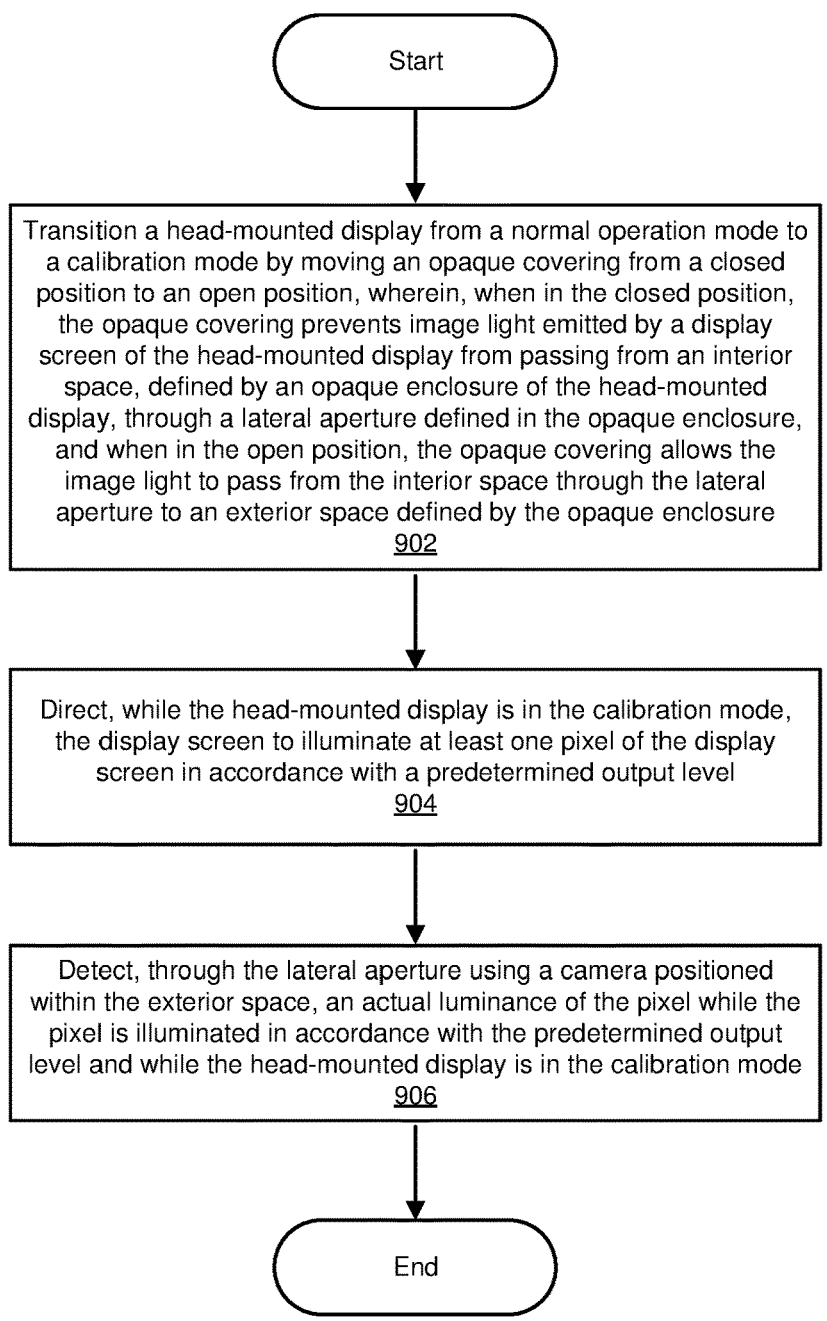
FIG. 9 is a block diagram of an exemplary method for measuring and adjusting the luminance of a head-mounted display.

FIG. 9 is a flow diagram of an exemplary computer-implemented method 900 for measuring and adjusting the luminance of a head-mounted display. The operations shown in FIG. 9 may be performed by any suitable computer-executable code and/or computing system, including display subsystem 600 in FIG. 6, subsystem 700 in FIG. 7, display calibration system 800 in FIG. 8, and/or variations or combinations of the same. In one example, each of the steps shown in FIG. 9 may represent an algorithm whose structure includes and/or is represented by multiple sub-steps, examples of which will be provided in greater detail below.

As illustrated in FIG. 9, at operation 902 one or more of the systems and/or apparatuses described herein may transition a head-mounted display from a normal operation mode to a calibration mode by moving an opaque covering from a closed position to an open position. When in the closed position, the opaque covering may prevent image light emitted by a display screen of the head-mounted display from passing from an interior space, defined by an opaque enclosure of the head-mounted display, through a lateral aperture defined in the opaque enclosure. When in the open position, the opaque covering may allow the image light to pass from the interior space through the lateral aperture to an exterior space defined by the opaque enclosure. The systems and/or apparatuses described herein may perform this operation in any of the ways described herein.

For example, as described above, subsystem 700 may, as part of display calibration system 800, send a control signal to an actuator included in pivot 220 that directs pivot 220 to move opaque covering 216 from the closed position to the open position. Additionally or alternatively, a user may manually move opaque covering 216 from the closed position to the open position. When in the closed position, opaque covering 216 may prevent image light emitted by display screen 210 from passing from interior space 204 defined by opaque enclosure 202 through lateral aperture 214 defined by opaque enclosure 202. When in the open position, opaque covering 216 may allow image light (e.g., emitted by display screen 210) to pass from interior space 204 through lateral aperture 214 to exterior space 206 defined by opaque enclosure 202.

At operation 904 in FIG. 9, one or more of the systems and/or apparatuses described herein may direct, while the head-mounted display is in the calibration mode, the display screen to illuminate at least one pixel of the display screen in accordance with a predetermined output level. The systems and/or apparatuses described herein may perform this operation in any of the ways described herein. For example, directing module 704 may, as part of display calibration system 800 via display computing device 602, direct display screen 210 to illuminate at least one pixel of display screen 210 in accordance with predetermined output level 812.

At operation 906 in FIG. 9, one or more of the systems and/or apparatuses described herein may detect, through the lateral aperture and using a camera positioned within the exterior space, the actual luminance of the pixel while the pixel is illuminated in accordance with the predetermined output level and while the head-mounted display is in the calibration mode. The systems and/or apparatuses described herein may perform this operation in any of the ways described herein.

For example, detecting module 706 may, as part of display calibration system 800, detect, through lateral aperture 214 using camera 108 positioned in exterior space 206, an actual luminance of the pixel while the pixel is illuminated in accordance with predetermined output level 812.

According to at least one embodiment, one or more of the systems and/or apparatuses described herein may also determine a new output level for the pixel based on the detected actual luminance of the pixel. The systems and/or apparatuses described herein may perform this operation in any of the ways described herein. For example, determining module 708 may, as part of display calibration system 800, determine a prospective output level for the pixel that, when the pixel is directed to operate in accordance with the prospective output level, will cause the pixel to generate an expected luminance. Determining module 708 may determine the prospective output level in any suitable way, such as by accessing table 820 that includes data representative of a compensation factor associated with actual luminance 808, and may adjust the predetermined output level in accordance with the data representative of the compensation factor, and store the result as new output level 814 in output level data 810.

According to at least one further embodiment, one or more of the systems and/or apparatuses described herein may also direct the pixel to operate in accordance with the new output level. The systems and/or apparatuses described herein may perform this operation in any of the ways described herein. For example, directing module 704 may, as part of display calibration system 800, send (e.g., by way of communication module 710) new output level 814 to display computing device 602, which may then utilize new output level 814 to drive display screen 210, which may result in the pixel operating in accordance with new output level 814.

In at least one additional embodiment, one or more of the systems and/or apparatuses described herein may transition the head-mounted display from the calibration mode to the normal operation mode by moving the opaque covering from the open position to the closed position. For example, as described above, subsystem 700 may, as part of display calibration system 800, send a control signal to an actuator included in pivot 220 that directs pivot 220 to move opaque covering 216 from the open position to the closed position. Additionally or alternatively, a user may manually move opaque covering 216 from the open position to the closed position.

As discussed throughout the instant disclosure, the disclosed apparatuses, systems, and methods may provide one or more advantages over traditional display calibration techniques. For example, the apparatuses, systems, and methods disclosed herein may accurately and efficiently measure and adjust the luminance of a head-mounted display without professional servicing of the head-mounted display and without any additional calibration hardware that may not already be included in the head-mounted display. This calibration may, in turn, improve the quality of images presented to a user by way of the head-mounted display, and increase user satisfaction with the head-mounted display.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive luminance data to be transformed, transform the luminance data, output a result of the transformation to adjust luminance of a head-mounted display, use the result of the transformation to adjust luminance of a head-mounted display, and store the result of the transformation to adjust luminance of a head-mounted display. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An ocular assembly for a head-mounted display, the ocular assembly comprising:
   at least one opaque enclosure that defines:
      an interior space;
      an exterior space;
      a display aperture that admits image light emitted by a display screen of the head-mounted display into the interior space;
      a lens aperture that admits light from the interior space into a lens assembly of the head-mounted display; and
      a lateral aperture that admits the light from the interior space into the exterior space; and
   an opaque covering for the lateral aperture that is coupled to the opaque enclosure, wherein the opaque covering is moveable between:
      a closed position that prevents the image light from passing from the interior space through the lateral aperture to the exterior space when the head-mounted display is in a normal operation mode; and
      an open position that allows the image light to pass from the interior space through the lateral aperture to the exterior space when the head-mounted display is in a calibration mode.

2. The ocular assembly of claim 1, wherein:
when the opaque covering is in the closed position, the opaque covering prevents the image light from passing through the lateral aperture to a camera located in the exterior space; and
when the opaque covering is in the open position, the image light passes from the interior space through the lateral aperture to the camera located in the exterior space.

3. The ocular assembly of claim 2, wherein the opaque covering comprises:
a lower portion that is pivotably coupled to the opaque enclosure; and
an upper portion that:
abuts the opaque enclosure when the opaque covering is in the closed position; and
extends into the interior space when the opaque covering is in the open position.

4. The ocular assembly of claim 3, wherein:
the opaque covering further comprises an outer portion that comprises a partially reflective surface; and
when the opaque covering is in the open position, the partially reflective surface of the outer portion of the opaque covering directs image light from the interior space through the lateral aperture to the exterior space.

5. The ocular assembly of claim 4, wherein, when the opaque covering is in the open position, the partially reflective surface directs light from the interior space through the lateral aperture toward the camera located in the exterior space.

6. A head-mounted-display system comprising:
a display screen;
a lens assembly;
an ocular assembly comprising:
at least one opaque enclosure that defines:
an interior space;
an exterior space;
a display aperture that admits image light emitted by the display screen;
a lens aperture that admits light from the interior space into the lens assembly; and
a lateral aperture that admits the light from the interior space into the exterior space; and
an opaque covering for the lateral aperture that is coupled to the opaque enclosure, wherein the opaque covering is moveable between:
a closed position that prevents the image light from passing from the interior space through the lateral aperture to the exterior space when the head-mounted-display system is in a normal operation mode; and
an open position that allows the image light to pass from the interior space through the lateral aperture to the exterior space when the head-mounted-display system is in a calibration mode.

7. The head-mounted-display system of claim 6, further comprising a camera located in the exterior space, wherein:
when the opaque covering is in the closed position, the opaque covering prevents the image light from passing through the lateral aperture to the camera; and
when the opaque covering is in the open position, the image light passes from the interior space through the lateral aperture to the camera.

8. The head-mounted-display system of claim 7, wherein the camera is configured to detect eye movements of a user wearing the head-mounted-display system during the normal operation mode.

9. The head-mounted-display system of claim 7, wherein the opaque covering comprises:
a lower portion that is pivotally coupled to the opaque enclosure; and
an upper portion that:
abuts the opaque enclosure when the opaque covering is in the closed position; and
extends into the interior space when the opaque covering is in the open position.

10. The head-mounted-display system of claim 9, wherein:
the opaque covering further comprises an outer portion that comprises a partially reflective surface; and
when the opaque covering is in the open position, the partially reflective surface of the outer portion of the opaque covering directs image light from the interior space through the lateral aperture to the exterior space.

11. The head-mounted-display system of claim 10, wherein, when the opaque covering is in the open position, the partially reflective surface directs light from the interior space through the lateral aperture toward the camera located in the exterior space.

12. The head-mounted-display system of claim 7, further comprising calibration circuitry that, when the head-mounted-display system is in the calibration mode:
directs the display screen to illuminate a pixel of the display screen in accordance with a predetermined output level;
detects an actual luminance of the pixel by using the camera to receive light generated by the pixel while the pixel is illuminated in accordance with the predetermined output level;
determines a new output level for the pixel based on the detected actual luminance of the pixel; and
directs the pixel to operate in accordance with the new output level.

13. The head-mounted-display system of claim 12, wherein the calibration circuitry determines the new output level for the pixel by:
determining a prospective output level for the pixel that, when the pixel is directed to operate in accordance with the prospective output level, will cause the pixel to generate an expected luminance; and
designating the determined prospective output level as the new output level.

14. The head-mounted-display system of claim 13, wherein the calibration circuitry determines the prospective output level for the pixel by:
accessing a look-up table comprising data representative of a compensation factor associated with the detected actual luminance of the pixel; and
adjusting the predetermined output level in accordance with the compensation factor.

15. The head-mounted-display system of claim 14, wherein the calibration circuitry further determines the prospective output level for the pixel based on an age of the display screen.

16. A method comprising:
transitioning a head-mounted display from a normal operation mode to a calibration mode by moving an opaque covering from a closed position to an open position, wherein:

when in the closed position, the opaque covering prevents image light emitted by a display screen of the head-mounted display from passing from an interior space, defined by an opaque enclosure of the head-mounted display, through a lateral aperture defined in the opaque enclosure; and when in the open position, the opaque covering allows the image light to pass from the interior space through the lateral aperture to an exterior space defined by the opaque enclosure;

directing, while the head-mounted display is in the calibration mode, the display screen to illuminate at least one pixel of the display screen in accordance with a predetermined output level; and detecting, through the lateral aperture using a camera positioned within the exterior space, an actual luminance of the pixel while the pixel is illuminated in accordance with the predetermined output level and while the head-mounted display is in the calibration mode.

17. The method of claim 16, further comprising:
determining a new output level for the pixel based on the detected actual luminance of the pixel; and
directing the pixel to operate in accordance with the new output level.

18. The method of claim 17, wherein determining the new output level for the pixel based on the detected actual luminance of the pixel comprises:
determining a prospective output level for the pixel that, when the pixel is directed to operate in accordance with the prospective output level, will cause the pixel to generate an expected luminance; and
designating the determined prospective output level as the new output level.

19. The method of claim 18, wherein determining the prospective output level for the pixel comprises:
accessing a look-up table comprising data representative of a compensation factor associated with the detected actual luminance of the pixel; and
adjusting the predetermined output level in accordance with the compensation factor.

20. The method of claim 16, further comprising transitioning the head-mounted display from the calibration mode to the normal operation mode by moving the opaque covering from the open position to the closed position.

* * * * *